US012589734B2

(12) United States Patent
Altmann et al.

(10) Patent No.: US 12,589,734 B2
(45) Date of Patent: Mar. 31, 2026

(54) METHOD FOR DEALING WITH OBSTACLES IN AN INDUSTRIAL TRUCK

(71) Applicant: Jungheinrich Aktiengesellschaft, Hamburg (DE)

(72) Inventors: Tony Altmann, Brokstedt (DE); Sebastian Rockel, Norderstedt (DE); Sven-Ole Heise, Osterrönfeld (DE); Steffen Quickert, Wildeshausen (DE); Christian Fischer, Boostedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 146 days.

(21) Appl. No.: 17/986,368

(22) Filed: Nov. 14, 2022

(65) Prior Publication Data

US 2023/0150486 A1 May 18, 2023

(30) Foreign Application Priority Data

Nov. 16, 2021 (EP) ..................................... 21208514

(51) Int. Cl.
B60W 30/09 (2012.01)
B60W 30/095 (2012.01)
(Continued)

(52) U.S. Cl.
CPC ........ B60W 30/09 (2013.01); B60W 30/0956 (2013.01); B60W 30/146 (2013.01);
(Continued)

(58) Field of Classification Search
CPC ............. B60W 30/09; B60W 30/0956; B60W 30/146; B60W 40/04; B60W 40/08;
(Continued)

(56) References Cited

U.S. PATENT DOCUMENTS

2010/0114405 A1* 5/2010 Elston .................. G05D 1/0212
701/1
2013/0060415 A1* 3/2013 Pfaff ..................... B66F 17/003
701/23
(Continued)

FOREIGN PATENT DOCUMENTS

EP 2763120 A1 8/2014
EP 3456681 A1 3/2019
WO 2013074034 A1 5/2013

OTHER PUBLICATIONS

European Application No. 21208514.6 , "Extended European Search Report", May 20, 2022, 8 pages.

*Primary Examiner* — Anne Marie Antonucci
*Assistant Examiner* — Patrick M Brady
(74) *Attorney, Agent, or Firm* — Kilpatrick Townsend & Stockton LLP

(57) ABSTRACT

A method for dealing with obstacles in an industrial truck, including detecting a current speed and a current steering angle of at least one steered wheel of the industrial truck using a speed sensor or a steering angle sensor. The method also includes calculating a protection zone based on the current speed and the current steering angle and evaluating data supplied by the at least one sensor unit within the protection zone. Responsive to detecting an obstacle in the protection zone, the method includes calculating a specific steering angle difference on a right side and a left side, the specific steering angle difference being such that collision with the obstacle is avoided on the respective side and one or more of, based on the calculated right side and left side steering angle differences, classifying a current degree of difficulty in avoiding obstacles or triggering a predetermined action.

19 Claims, 4 Drawing Sheets

(51) Int. Cl.

| | |
|---|---|
| *B60W 30/14* | (2006.01) |
| *B60W 40/04* | (2006.01) |
| *B60W 40/08* | (2012.01) |
| *B60W 40/105* | (2012.01) |
| *B60W 40/13* | (2012.01) |
| *B60W 50/00* | (2006.01) |
| *B60W 50/14* | (2020.01) |

(52) U.S. Cl.
CPC ............ *B60W 40/04* (2013.01); *B60W 40/08* (2013.01); *B60W 40/105* (2013.01); *B60W 40/13* (2013.01); *B60W 50/0097* (2013.01); *B60W 50/14* (2013.01); *B60W 2040/1315* (2013.01); *B60W 2050/143* (2013.01); *B60W 2050/146* (2013.01); *B60W 2300/121* (2013.01); *B60W 2420/408* (2024.01); *B60W 2540/18* (2013.01)

(58) Field of Classification Search
CPC .............. B60W 40/105; B60W 40/13; B60W 50/0097; B60W 50/14; B60W 2420/408; B60W 2040/1315; B60W 2050/143; B60W 2050/146; B60W 2300/121; B60W 2300/12

See application file for complete search history.

(56) References Cited

U.S. PATENT DOCUMENTS

| | | | |
|---|---|---|---|
| 2014/0005875 A1 | 1/2014 | Hartmann et al. | |
| 2018/0174462 A1* | 6/2018 | Um ...................... | B60W 40/12 |
| 2018/0178783 A1* | 6/2018 | Saiki .................... | B60W 30/09 |
| 2019/0071292 A1 | 3/2019 | Goepner | |
| 2019/0271990 A1* | 9/2019 | Grabbe ................ | G05D 1/0297 |
| 2019/0299982 A1* | 10/2019 | Guechai ................ | B60W 30/09 |

* cited by examiner

Fig. 4 free route found search left for free route predicted
current route search right for free route free route found steering angle difference -10° steering angle difference -3° current steering angle steering angle difference +3° steering angle difference +10° easy degree of difficulty
- no actions high degree of difficulty
- actions high degree of difficulty
- actions high degree of difficulty
- actions high degree of difficulty
- actions Speed limit: 2.2 m/s Speed limit: 2.0 m/s Speed limit: 1.7 m/s

METHOD FOR DEALING WITH OBSTACLES IN AN INDUSTRIAL TRUCK

CROSS REFERENCE TO RELATED APPLICATION

This application claims priority to European Patent Application No. 21208514.6, filed in Europe on Nov. 16, 2021, the entire contents of which are hereby incorporated herein by this reference.

The present invention relates to a method for dealing with obstacles in an industrial truck, which comprises at least one sensor unit which is arranged in the main direction of travel of the industrial truck and is set up to be able to detect obstacles in a predetermined angular range. Furthermore, the invention relates to an industrial truck which is set up to carry out such a method during its operation.

In the daily use of transport devices in logistics facilities, collisions between industrial trucks and warehouse equipment, industrial trucks and other vehicles or industrial trucks and people can occur more frequently, especially at peak times. One approach to counteracting such collisions can consist in using a radio-based system with which the industrial trucks are informed about the presence of obstacles. However, this shows that the sensors currently used in automated vehicles in particular lead to unnecessary braking and thus to a reduction in the performance of such vehicles.

In order also to be able to include objects and people without such radio equipment in the protection concept, it is known to use sensor units in industrial trucks, which check the surroundings for obstacles and can be mounted and aligned on the industrial trucks, in particular in the main direction of travel. So-called protective fields are set up here, which are often located in horizontal planes just above the driving surface.

If an object is recognised by such a sensor unit, corresponding information can be generated and/or a vehicle reaction can be triggered. It is of course desirable here that a corresponding vehicle only reacts when a collision is actually possible, i.e. when there is an obstacle in the intended range of movement of the vehicle. It is therefore essential for such safety systems to define a collision zone or protection zone.

In previously known methods for defining collision zones, it was customary to permanently program a plurality of collision zones in the form of parameterised geometric fields at suitable points in a processing arrangement in order to be able to access them when operating industrial trucks of this type. In order to improve the protective effect at different speeds and steering angles of the corresponding industrial truck, switching to and fro between the various permanently programmed fields in the field of view of the sensor unit was then carried out in order to determine possible collision risks and, at the same time, to blank out non-relevant areas. Consequently, for example, protective fields of an autonomous transport system (AGV—Automated Guided Vehicle) could serve as the safety system of such an industrial truck, while within the scope of the present invention they can also be used in manually controlled industrial trucks in the manner described below.

However, this shows that the possible number of such fields is limited by the system and a physical connection between the components of the processing arrangement involved in this method must be used for the addressed switching through the zones, mostly on the basis of digital inputs and data connections. Furthermore, a different set of fields must be generated for each conceivable vehicle type and for each series of vehicles and made available to the corresponding sensor units on an assigned memory. This involves a considerable design effort and expense.

It is therefore desired within the scope of the present invention to use an improved approach for defining a protection zone in an industrial truck, which can eliminate the disadvantages mentioned above. In particular, a method is to be used by which accidents caused by collisions with obstacles can be prevented in both automated and manually controlled industrial trucks, where the obstacles can be formed by people, pallets or other objects in the operating environment of the industrial truck. Depending on the type of industrial truck used, such collisions can be caused, for example, by human error, i.e. the driver of the industrial truck overlooking an obstacle, or errors in sensor data processing or in the sensor itself in autonomously guided industrial trucks.

However, when such protection zones are used, it is also shown that a variety of situations can arise in which false positive detections of obstacles occur, for example in cases in which manually operated industrial trucks make a turn near a wall and with a simple projection of the current route of the industrial truck into the future, a collision with the wall would be expected, even though the relevant driver of the industrial truck has the situation under control and would counter-steer in time to end the turning and would then move parallel to the wall, for example. Corresponding scenarios are also conceivable in autonomous industrial trucks, but since the planned route there is deterministic and does not have to be aimed at the behaviour of a human operator, it can be estimated in such a case in advance whether possible violation a protection zone is intentional behaviour, for example in the context of the above example of turning, or whether in fact a collision with an initially unforeseen obstacle is to be feared.

There is therefore a need at this point for an assistance system and a corresponding method with which obstacles detected during operation of such an industrial truck can be dealt with in an improved manner, and conclusions can be drawn as to the extent to which a current situation of the industrial truck, with regard to such obstacles, is indeed problematic in order to be able to avoid or completely rule out false positive detections of obstacles, but without intervening in situations in which, in particular, a driver of the industrial truck has the situation under control and it is behaviour which may be expected and is without risk.

To solve this problem, a method for dealing with obstacles in an industrial truck is proposed according to the invention, which has a known vehicle outline in a top view and comprises at least one sensor unit which is arranged in the main direction of travel of the industrial truck and is set up to be able to detect obstacles in a predetermined angular range, said method comprising detecting a current speed and a current steering angle of at least one steered wheel of the industrial truck by means of a speed sensor or a steering angle sensor of the industrial truck, calculating a predicted vehicle contour based on the vehicle outline, the current speed and the current steering angle such that the predicted vehicle contour corresponds to an area to be traversed by the industrial truck in a predetermined time period, evaluating the data supplied by the at least one sensor unit within the predicted vehicle contour as a protection zone of the industrial truck, and when an obstacle is detected in the protection zone, calculating a specific steering angle difference on each side at which a collision with the obstacle is avoided, and classifying a current degree of difficulty in avoiding the obstacle using the calculated steering angle differences, in particular using a steering angle difference limit value, and/or triggering a predetermined action using the calculated steering angle differences, in particular using a steering angle difference limit value.

The method according to the invention makes it possible to classify current driving situations in which an obstacle has been detected in a protection zone of an industrial truck according to degrees of difficulty, which are based at least on a steering angle difference which would be necessary to avoid the obstacle, and/or to intervene in the operation of the vehicle by triggering actions directly and automatically. Accordingly, in the example already mentioned above of turning near a wall, it could be determined that a collision could already be avoided with a small steering angle difference in a direction away from the wall, so that such a situation would be classified with a low degree of difficulty and/or it would be decided that no action in the sense of intervening in the operation of the vehicle is necessary. The use of a steering angle difference limit value, which is possible in this context, makes it possible to distinguish between an intentional and an unintentional violation of the protective field for a human driver in a relatively simple manner. In this case, this limit value can depend on the current speed, the current steering angle, the level of experience of the driver, etc.

It can be seen that the smaller of the two steering angle differences can be used to classify the current degree of difficulty, since it can usually be assumed that an avoiding movement to the corresponding side would take place, which corresponds to typical behaviour of a human driver of such a vehicle. Accordingly, in the above-mentioned example of turning in the region of a wall, it would be irrelevant that the required steering angle difference for avoiding the obstacle in the direction towards the wall would be significantly greater, since avoiding the wall would usually take place.

Although the classification of current levels of difficulty in the operation of an industrial truck could also be used only to collect data for an evaluation of a traversed logistics environment or the like, a predetermined action could also be triggered on the industrial truck in the method according to the invention, for example, depending on the current degree of difficulty, in order to be able to immediately provide an assistance system for increased operational safety and to immediately create a causal connection between the degree of difficulty and the corresponding action. In this case, the manner in which the predetermined action is carried out can also depend on various other parameters, as will be addressed further below.

An example of such a predetermined action could include reducing a current and/or maximum speed of the industrial truck, so that accordingly either a limitation of the achievable speed of the industrial truck or an immediate automatic braking of it, for example depending on the current degree of difficulty, can be carried out. In particular, such a reduction in the maximum or current speed can be undertaken in such a way that a complete stop in front of the obstacle remains possible in any case, this being an iterative process which, as driving continues towards an obstacle, will ultimately cause the vehicle to come to a complete standstill. If, on the other hand, it is determined in the meantime that the obstacle is no longer in the protection zone, for example because it has been avoided or the obstacle itself has moved out of the protection zone, the corresponding action can be cancelled, and the vehicle can be accelerated again and/or its maximum speed can be raised again.

An additional or alternative predetermined action could include issuing an appropriate message to an operator, for example a warning on a display or an audible signal. Although one can primarily think of a driver of the industrial truck in the case of a manually controlled vehicle, an output to a remote operator or to a control centre for information of an operator working there would of course also be conceivable in the case of remote-controlled or autonomously guided vehicles.

In principle, different approaches are conceivable with regard to the type of output. For example, only a warning light could light up in the operator's field of view or an audible warning signal could be emitted if a situation with a certain degree of difficulty exists, or the operator could be provided with further information on a dedicated display device, for example a map view, on which the relevant obstacle is displayed together with the vehicle in relative spatial relationship together with a warning.

According to the invention, in the present method for classifying the current degree of difficulty and/or for triggering the predetermined action further parameters can be taken into account, in particular the current steering angle of the industrial truck, the current speed of the industrial truck, a level of experience of a driver of the industrial truck and/or the calculated steering angle difference compared to the current steering angle. An example of this could be that when driving straight ahead and detecting an obstacle in the corresponding protection zone, a classification could always be performed which would entail an immediate predetermined action, since it can be assumed that no case should occur in which the industrial truck drives head-on towards an obstacle. Likewise, at a higher current speed, braking could take place earlier and more strongly, and it could be taken into account that, due to the centrifugal forces that occur, avoidance is easier in a direction opposite to a current turning movement and can consequently entail a lower degree of difficulty. In addition, it could be taken into account that in cases where the vehicle is already making a turn, it may make more sense to effect avoidance by steering in a straight line, even if the steering angle difference is greater than in the case of an avoiding manoeuvre to the inside of the curve, since in this case steering in the direction of the inside of the curve can mean a reversal of the vehicle, while in the other direction steering of the vehicle in a straight line allows avoidance. Also, when making a turn, in some circumstances it may be more realistic that a target direction of travel is more in the direction of going straight ahead than making a turn with a smaller radius, for example in a case of delayed steering in a straight line when making a turn.

The level of experience of the driver can be included in the classification of the current degree of difficulty and/or the triggering of the predetermined action in such a way that corresponding data on the level of experience are stored in a suitable manner and then, for example, in the case of a driver with more experience, when an obstacle is detected less strong actions can be initiated than in the case of a less experienced driver, since the two drivers are adjudged to have different abilities in avoiding obstacles and in dealing with potentially critical situations. Certain situations which would already be rated with a higher degree of difficulty in the case of less experienced drivers or would trigger actions could also still be tolerated, i.e. rated with a low degree of difficulty or no level at all, in the case of more experienced drivers. The actions actually carried out can also be made dependent on the level of experience in a similar way, for example by stronger automatic braking in the case of a less experienced driver in order to achieve greater safety tolerances when operating the industrial truck.

Although the classification of the current levels of difficulty initially allows any number of gradations, it can at least include an easy degree of difficulty and a high degree of difficulty, i.e. in addition to a state without a degree of difficulty (no protective field violation) two different categories, which correspond to a tolerable protective field violation and an intolerable protective field violation, in which, for example, an avoiding steering angle limit value is accordingly undershot or exceeded. In this case, if the degree of difficulty is low, only a warning could optionally be issued, while if the degree of difficulty is high, automatic actions could be triggered in the industrial truck which affect its operation, for example the automatic braking of the truck, which has already been mentioned several times. Alternatively, no action could be taken at the low degree of difficulty and a warning could be issued at the high degree of difficulty. The decision as to which action is to be taken at which degree of difficulty can be made, for example, on the basis of the driver's level of experience or on the basis of the speed currently being driven. Thus, at a comparatively low speed and a high degree of difficulty, only a warning may be issued, while at a comparatively high speed and a high degree of difficulty, automatic braking can take place.

In this context, a maximum steering angle of the industrial truck can also be defined, which cannot be exceeded to avoid a collision, so that in certain situations it can be determined that avoidance in the corresponding direction is ruled out under the current circumstances.

With regard to the detection of obstacles in the determined protection zone, the current speed of the industrial truck can be included according to the invention in such a way that the evaluation of a predetermined time period shows the distance the industrial truck is expected to move in this predetermined time period, which in turn will be reflected in the calculated protection zone. Furthermore, it can be assumed that the industrial truck has a known vehicle outline in a plan view and the protection zone can be calculated using the vehicle outline in such a way that a predicted vehicle contour, which corresponds to an area to be traversed by the industrial truck in a predetermined time period, is used as the protection zone.

Thus, with the method according to the invention, the area likely to be traversed by the vehicle in a predetermined time period can be mapped exactly and, depending on the resolution of the available sensor data, a single protection zone that adapts to the current operating situation of the industrial truck can be obtained, which in turn can be used as a basis for the procedure described above. Accordingly, incorrect detections can already be avoided at this point and the prediction of obstacles in a route of the industrial truck can be applied to a wide variety of vehicle types, as long as the particular known vehicle outline of the corresponding vehicle types is available when the method is carried out. Of course, it is also possible in this context to define the vehicle outline in such a way that it is selected to be larger than the actual external dimensions of the corresponding industrial truck, for example in order to be able to take into account loads to be supported or distance tolerances to be respected.

In this case, the predicted vehicle contour can be calculated in polar coordinates, wherein in particular the pole of the polar coordinate system can correspond to a centre point of the industrial truck in relation to the longitudinal and width axis thereof and/or the polar axis of the polar coordinate system can correspond to the main direction of travel of the industrial truck.

This use of polar coordinates means that the computational complexity of obstacle detection can be kept very low, since trigonometric functions do not have to be solved nor do roots have to be calculated. Rather, through an interpolation of the predicted vehicle contour predicted by contour points, which corresponds to the resolution of the at least one sensor unit used, the detection of obstacles can only be implemented as a comparison of detected distances with predicted distances and can therefore be attributed to a greater than or equal operation. In other words, when an object is detected at a specific angle to the polar axis of the polar coordinate system, a comparison can be made between the determined distance between the object and the industrial truck and a predicted distance, with a collision being expected if the distance is below this prediction.

Furthermore, the predicted vehicle contour can be calculated by calculating a plurality of reference points, which corresponds to a calculation of positions of the vehicle at successive points in time in the future. The number of reference points can be selected depending on the current vehicle speed in order to obtain an optimally constructed protection zone in the manner described above, and the granularity of the support point calculation can also be carried out in a way that provides an optimal compromise between computational effort and resolution of the protection zone offers. In particular, it is also possible to carry out an interpolation or smoothing of the trajectories containing the reference points as boundary lines of the protection zone.

As already mentioned above, the present invention also relates to an industrial truck which is set up to carry out a method of the type just described during its operation, comprising a vehicle body, at least one sensor unit which is arranged in the main direction of travel of the industrial truck and set up to be able to detect obstacles in a predetermined angular range, a speed sensor and a steering angle sensor, and a control unit which is set up to receive data from the speed sensor and the steering angle sensor, to calculate a protection zone in the manner described above, to calculate a steering angle difference on both sides, in which in each case a collision with an obstacle detected within the protection zone is avoided, and to classify a current degree of difficulty in avoiding the obstacle on the basis of the calculated steering angle differences and/or a predetermined action based on the calculated steering angle differences.

When determining the protection zone, a vehicle contour can be calculated using a known vehicle outline, as mentioned. Here again, the vehicle outline used to calculate the predicted vehicle contour can be selected to be larger than the actual vehicle body in order to be able to take into account the loads to be supported and distance tolerances.

Furthermore, it should be noted at this point that the predetermined angular range in which the at least one sensor unit detects the surroundings of the industrial truck should expediently be at least as large as a possible steering angle of the industrial truck and should optimally be 180° around the main direction of travel.

Although different types of sensor units can be considered in industrial trucks according to the invention, this sensor unit can in particular include a LIDAR unit, such sensor types being characterised by high accuracy and reliability at a reasonable price.

Finally, it should be pointed out that the industrial truck according to the present invention can be a manually operated industrial truck and the method according to the invention is therefore used to support a human driver, although in principle use also as a safety system in an autonomously operated vehicle cannot be ruled out.

Further features and advantages of the present invention will become even clearer from the following description of an embodiment, when said embodiment is considered together with the accompanying drawings. In detail, in the drawings:

FIG. 1 is a schematic representation of an operating situation of an industrial truck according to the invention at a predetermined steering angle;

FIG. 2 is a schematic representation for defining a protection zone in the example of FIG. 1;

FIG. 3 is a schematic representation of an internal representation of the protection zone and the detection of an obstacle;

FIG. 4 is a schematic representation of a calculation of steering angle differences to avoid a collision with an obstacle;

FIG. 1 is a schematic top view of an operating situation of an industrial truck 10 according to the invention, which is making a left turn with a steering angle of 15° with respect to its main direction of travel or longitudinal direction L, in order to illustrate the calculation of a protection zone of the industrial truck 10.

Figures 1, 2, 3:
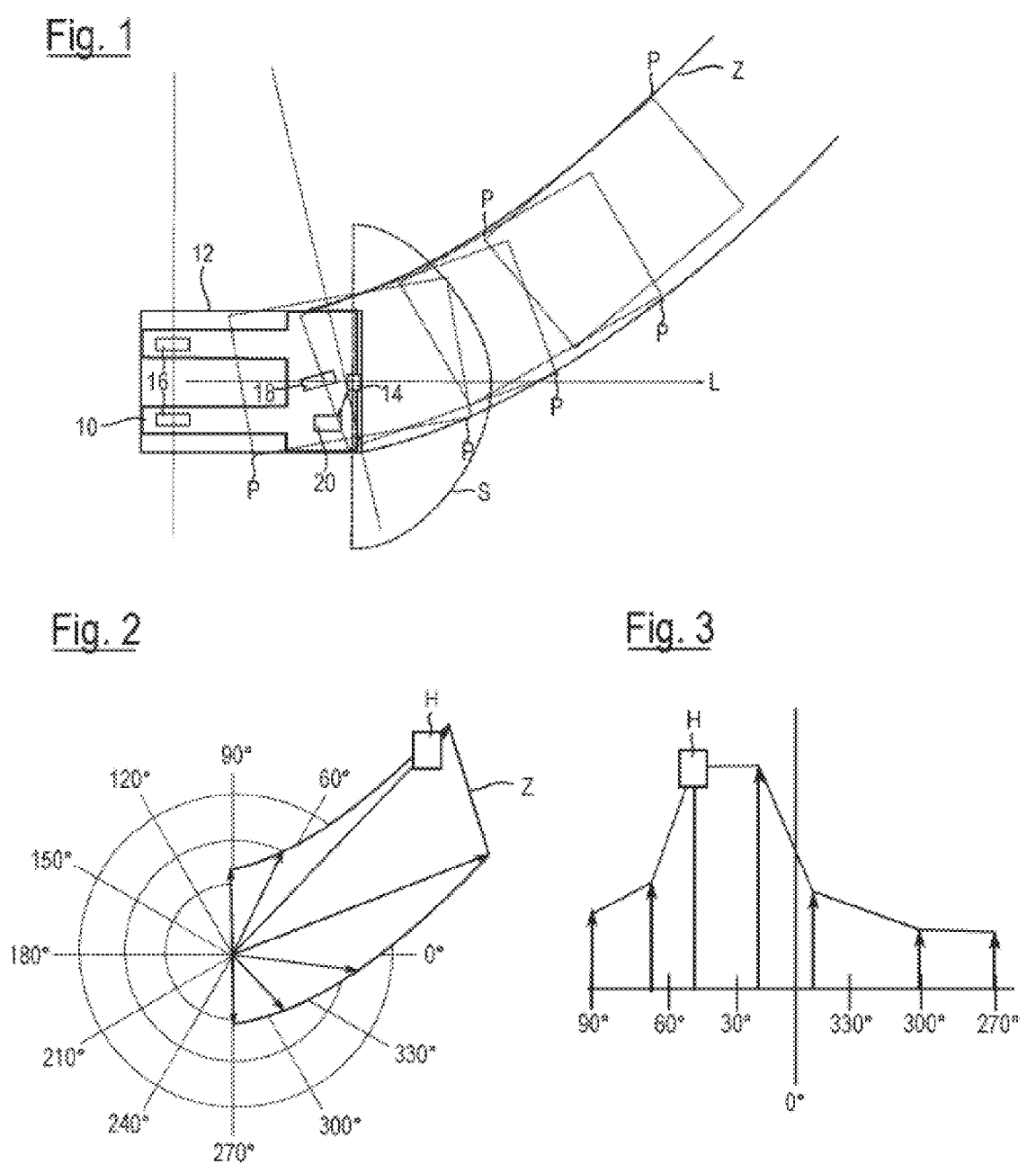
Figure 5:
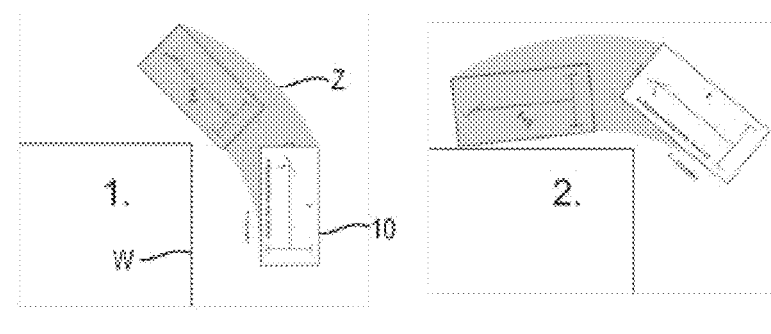
FIG. 5 is a schematic representation of a further operating situation of an industrial truck according to the invention.
Figure 5:
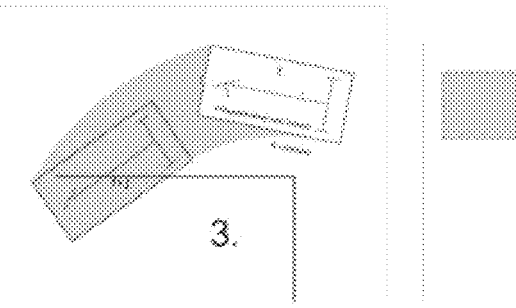
Figure 5:
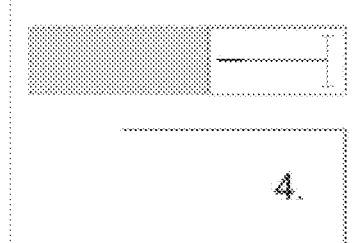

The industrial truck 10 here has a known vehicle outline 12 which projects beyond the actual vehicle body in such a way that loads possibly carried by the vehicle 10 are also covered. The industrial truck 10 also includes a sensor unit 14, which is arranged on the front of the industrial truck 10 in the main direction of travel L and covers an angular range of at least 180°, as indicated by the schematically illustrated sensor field S in FIG. 1, wherein the extent of the sensor field S will, of course, extend substantially further around the vehicle 10 in practice than indicated in the schematic view of FIG. 1.

The industrial truck 10 also includes a pair of non-steered wheels 16 and a steered wheel 18, and in the case shown here, the industrial truck 10 is a manually controlled industrial truck which is provided and set up for transporting objects in logistics facilities. For this purpose, it also comprises a control unit 20, shown only schematically, as well as speed and steering angle sensors, not shown in detail, which supply their data to the control unit 20 in the same way as the sensor unit 14.

As can be seen from FIG. 1, the control unit 20 carries out a method for defining a protection zone, the outline of which is indicated schematically in FIG. 1 by two curved lines and is denoted by the reference symbol Z. The resulting protection zone Z corresponds to a predicted vehicle contour, which is determined on the basis of the known vehicle outline 12, the current speed and the current steering angle, which are supplied by the speed and steering angle sensors already mentioned.

The method according to the invention for defining the protection zone Z is carried out by means of an iterative calculation of a plurality of reference points P, which each correspond to the corners of the vehicle outline 12 when the vehicle 10 has progressed by a certain distance on the curved route mentioned. Such extrapolated positions of the industrial truck 10 are shown in FIG. 1 in dashed lines. The protection zone Z can now be determined on the basis of the reference points P determined in this way, with both the granularity of the evaluation of the reference points P and the number of reference points P taken into consideration being suitably selectable and, if necessary, an interpolation of the reference points P to smooth the outlines of the protection zone Z can be carried out.

Accordingly, when viewed in polar coordinates, in which the main direction of travel or longitudinal direction L of the industrial truck 10 corresponds to the polar axis 0°, a protection zone Z as shown in FIG. 2 can be obtained. If this protection zone Z from FIG. 2 is now also plotted in a histogram in which the polar angle forms the x-axis, the result is the representation from FIG. 3 in which again the main direction of travel or longitudinal direction L is 0°, and the fact that the vehicle 10 is currently making a left turn means that the angular range between 30° and 60° reflects a greater extent in relation to the protection zone Z.

In particular, by the use of polar coordinates an obstacle H, which is shown in FIGS. 2 and 3, can be classified as falling into the protection zone Z with little calculation effort, by carrying out a simple distance calculation at the corresponding angle. In this way, with the method according to the invention, an optimal protection zone Z can be determined in such an industrial truck in such a way that obstacles H can be reliably detected, but on the other hand false positive results are minimised or even completely ruled out by the optimal definition of the protection zone Z.

On the basis of this determination of a protection zone, the calculation of a steering angle difference used according to the invention to prevent a collision with the obstacle on both sides will now be described with reference to FIG. 4.

Figure 4:
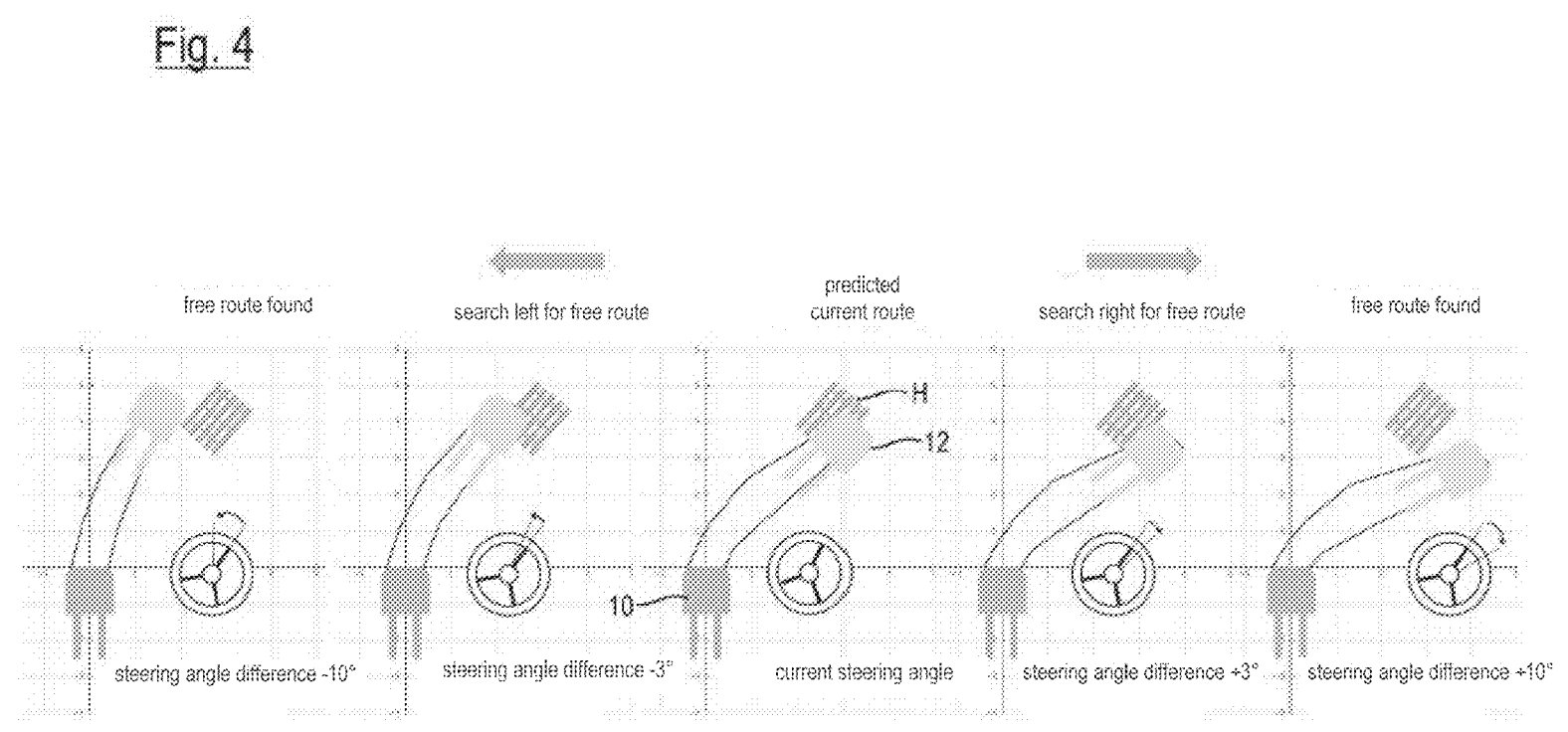

In the case shown in the centre of FIG. 4, the industrial truck 10 is making a right turn and it has been determined that there is an obstacle H in the form of a pallet on the corresponding predicted route, which corresponds to the protection zone of the vehicle 10. Starting from this current steering angle, both an increase in the current steering angle, i.e. avoidance to the right, and a decrease in the current steering angle, i.e. avoidance to the left, are simulated in real time and, based on the known vehicle outline 12 of the industrial truck 10, it can be deduced that a steering angle difference of at least 10° to the right or left is necessary to avoid the obstacle H, as can be seen from the illustrations on the far right and far left in FIG. 4, while a steering angle difference of, for example, 3° to the right or left is still not sufficient, as can be seen from the further illustrations.

This procedure can be used to deduce required steering angle differences on both sides, which can be used in the classification of a current degree of difficulty for obstacle avoidance described below, with the smaller of the two steering angle differences usually being used for classification.

Reference is first made to FIG. 5, which in its four representations 1. to 4. illustrates an industrial truck 10 making a turn in the region of a right-angled wall W, which is shown in each case with its protection zone Z determined in accordance with the procedure described above and shown in FIG. 1. Such a situation represents a typical operating case of such an industrial truck 10 and should therefore be manageable by a human driver of the industrial truck 10 without any problems.

However, it appears that, after turning in representation 1. of FIG. 5 in the state of representation 2. and particularly representation 3., the right-angled wall protrudes into the protection zone Z of the industrial truck 10 and is thus detected as an obstacle. However, the driver of the industrial truck 10 can already prevent a collision with the wall by slightly counter-steering to the right or straightening his steering wheel in the context of normal turning, so that, due to the correspondingly determined small steering angle difference required relative to the current value, at no time does a problematic situation occur and consequently the degree of difficulty can be determined as low at any time. Accordingly, it is not necessary to initiate any actions and the driver of the industrial truck 10 can straighten the steering at the exit of the turn and continue his journey undisturbed and as shown in representation 4. of FIG. 5 and can continue his journey without the temporary presence of the wall in the protection zone Z having an effect on the process described.

Figure 6:
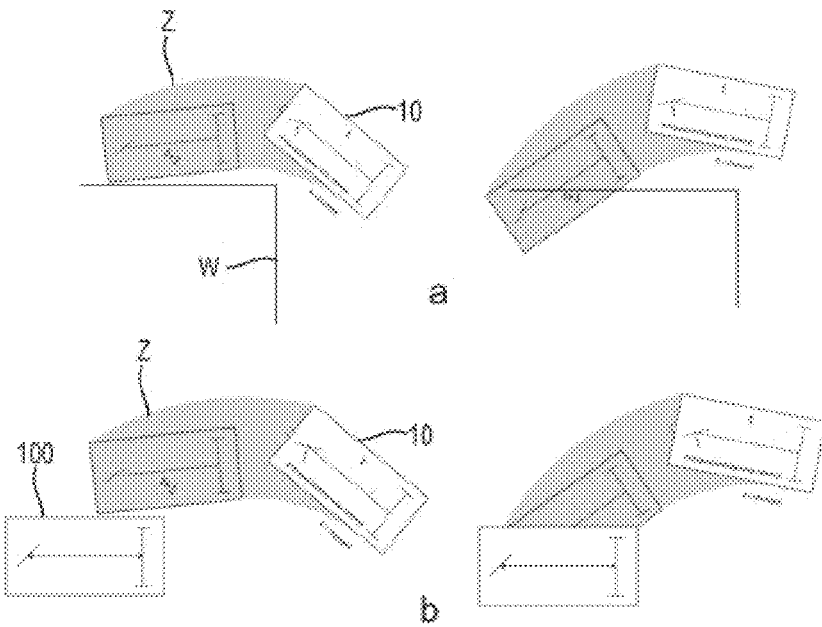
FIG. 6 is a comparative representation of two operating situations of an industrial truck according to the invention.

For comparison, in FIG. 6 representation a initially again indicates the situation from FIG. 5 which has just been discussed, while representation b shows a case in which the corresponding situation is assessed as having a high degree of difficulty. In this case, another industrial truck 100 is recognised as an obstacle, which enters the protection zone Z of the industrial truck 10 at a certain point in time. Since the industrial truck 10 is moving at a higher speed compared to representation a and has already come closer to the obstacle, this situation is rated as having a high degree of difficulty, even though a relatively small steering angle difference would be sufficient here to avoid the obstacle. It is thus evident that the method according to the invention can be further improved by including further parameters in addition to the steering angle difference when evaluating the current degree of difficulty.

Figure 7:
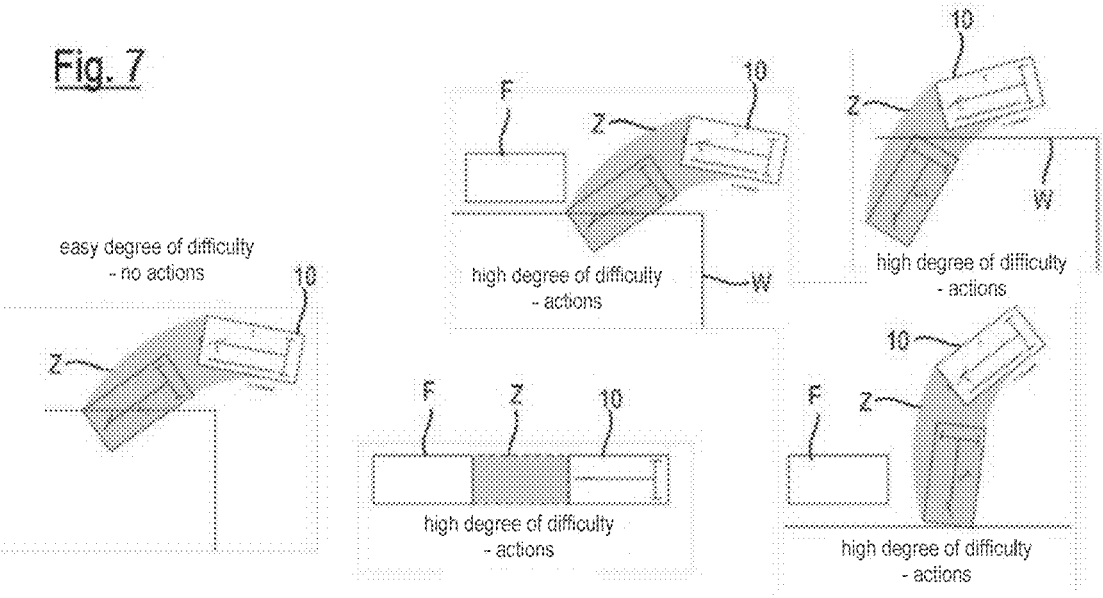
FIG. 7 is an overview of several operating situations of an industrial truck according to the invention with corresponding degrees of difficulty.

FIG. 7 now shows some further scenarios in which a high degree of difficulty is determined and corresponding actions can be initiated, for example issuing a warning to a driver of the industrial truck 10 and/or automatically reducing a current or maximum speed thereof.

While, as discussed in connection with FIG. 5 and again indicated on the left in FIG. 7, driving through a curve near a right-angled wall is evaluated with an easy degree of difficulty due to the small necessary steering angle difference in order to prevent a collision, and consequently no actions are initiated, the other four representations each show cases in which high degrees of difficulty are determined. In the case shown above in the centre, there is a further industrial truck F in the region of the right-angled wall W, which would require a significantly greater steering difference to the right at the exit of the turn and consequently causes a more difficult situation. Similarly, in the case shown at the top right, the industrial truck 10 has followed the curved route too far and has thus already come very close to the wall W at an unfavourable angle. Here, too, a large steering angle difference to the right is necessary to prevent a collision, and the situation is rated as having a high degree of difficulty.

In the illustration at the bottom right, a further industrial truck F is again present as an additional obstacle, and the industrial truck 10 considered here drives towards the wall at an unfavourable angle for avoidance to the right or left. A high degree of difficulty is therefore also present here and suitable actions such as automatic braking and/or warning a driver can be initiated. Finally, a case is shown in the centre below in which an obstacle is detected in the protection zone Z when driving straight ahead. For such cases, it can be specified that a classification with a high degree of difficulty is carried out in each case, since it can be assumed that under no circumstances should the industrial truck 10 drive head-on into an obstacle.

Figure 8:
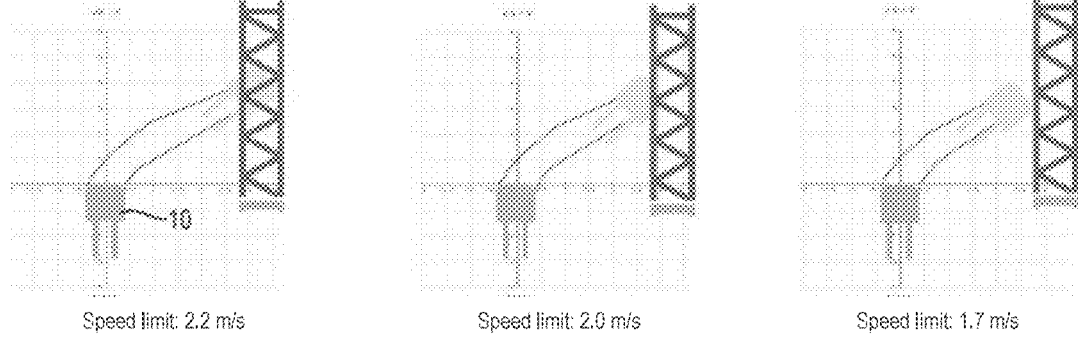
FIG. 8 is a schematic representation of a determination of a maximum permissible speed of an industrial truck according to the invention.

Finally, with reference to FIG. 8, an exemplary action should be described in the event of an obstacle being detected in a protection zone of an industrial truck 10, namely an automatic speed reduction. In this case, it is first established in the illustration on the left that, due to its current steering angle, the industrial truck 10 is driving towards a wall which has entered the protection zone of the industrial truck 10. On the basis of the procedure described above, it is then determined that this is a situation which makes it necessary to initiate an action, in this case reducing the speed of vehicle 10.

For this purpose, starting from the current speed of the industrial truck 10 of 2.2 m/s, the amount by which the speed must be reduced in order to bring the vehicle 10 to a stop just before the obstacle is determined. This results in a value of 1.7 m/s, while a collision would still occur at a speed of 2.0 m/s, as indicated in the illustrations on the right and in the centre of FIG. 8. Accordingly, the speed is reduced to 1.7 m/s, with further checks being carried out in the same way while the industrial truck 10 is driving, in order to be able to slow the vehicle 10 down more as it further approaches the wall or in the event of an avoidance, i.e. steering to the left, to raise the speed limit again if necessary.

The invention claimed is:

1. A method for dealing with obstacles in an industrial truck that comprises at least one sensor unit arranged in a main direction of travel of the industrial truck and configured to detect obstacles in a predetermined angular range, the method comprising:

detecting a current speed using a speed sensor of the industrial truck and a current steering angle of at least one steered wheel of the industrial truck using a steering angle sensor of the industrial truck;

calculating, by a control unit, a protection zone based on the current steering angle and a known vehicle outline, wherein the protection zone corresponds to an area to be traversed by the known vehicle outline in a predetermined time period;

evaluating, by the control unit, data supplied by the at least one sensor unit in response to detecting an obstacle within the protection zone of the industrial truck; and responsive to detecting the obstacle in the protection zone:

calculating a right side steering angle difference representing a difference in the current steering angle and an angle required to avoid a collision with the obstacle on a right side of the industrial truck;

calculating a left side steering angle difference representing a difference in the current steering angle and an angle required to avoid a collision with the obstacle on a left side of the industrial truck;

classifying a current degree of difficulty in avoiding obstacles based at least on the current speed, and either of the right side steering angle difference and the left side steering angle difference exceeding a steering angle difference limit value, wherein the current degree of difficulty distinguishes between an intentional and an unintentional violation of the protection zone by a human driver of the industrial truck; and performing a predetermined action based on determining that the current degree of difficulty in avoiding the collision exceeds a predetermined degree of difficulty, wherein the predetermined action comprises one or more of:

automatically braking the industrial truck;

limiting a maximum speed of the industrial truck; or temporarily generating a warning which is presented to an operator of the industrial truck until the obstacle is no longer in the protection zone.

2. The method of claim 1, wherein a smaller of the right side steering angle difference and the left side steering angle difference is used to classify the current degree of difficulty.

3. The method of claim 1, wherein classifying the current degree of difficulty is further based on:

a level of experience of a driver of the industrial truck.

4. The method of claim 1, wherein available classifications for the current degree of difficulty comprises at least an easy difficulty level and a high difficulty level.

5. The method of claim 1, further comprising defining a maximum steering angle of the industrial truck that cannot be exceeded to avoid a collision.

6. The method of claim 1, wherein the known vehicle outline is in a plan view.

7. The method of claim 6, wherein the protection zone is calculated in polar coordinates using a polar coordinate system.

8. The method of claim 7, wherein one or more of:

a pole of the polar coordinate system corresponds to a center point of the industrial truck in relation to the longitudinal and width axis thereof, or a polar axis of the polar coordinate system corresponds to the main direction of travel of the industrial truck.

9. The method of claim 6, wherein the protection zone is calculated by calculating a plurality of reference points.

10. The method of claim 9, wherein a number of reference points is selected based on the current speed of the industrial truck.

11. An industrial truck comprising:

a vehicle body, at least one sensor unit arranged in a main direction of travel of the industrial truck and configured to detect obstacles in a predetermined angular range;

a speed sensor for detecting a current speed of the industrial truck and a steering angle sensor for detecting a current steering angle of the industrial truck; and a control unit configured to:

receive data from the speed sensor and the steering angle sensor;

calculate, by the control unit, a protection zone based the current steering angle, and a known vehicle outline, wherein the protection zone corresponds to an area to be traversed by the known vehicle outline in a predetermined time period;

evaluate, by the control unit, data supplied by the at least one sensor unit in response to detecting an obstacle within the protection zone of the industrial truck; and responsive to detecting the obstacle in the protection zone:

calculate a right side steering angle difference representing a difference in the current steering angle and an angle required to avoid a collision with the obstacle on a right side of the industrial truck;

calculate a left side steering angle difference representing a difference in a current steering angle required to avoid a collision with the obstacle on a left side of the industrial truck; and classify a current degree of difficulty in avoiding obstacles based on the current speed, and either of the right side steering angle difference and the left side steering angle difference exceeding a steering angle difference limit value, wherein the current degree of difficulty distinguishes between an intentional and an unintentional violation of the protection zone by a human driver of the industrial truck; and perform a predetermined action based on determining that the current degree of difficulty in avoiding the collision exceeds a predetermined degree of difficulty, wherein the predetermined action comprises one or more of:

automatically braking the industrial truck;

limiting a maximum speed of the industrial truck; or temporarily generating a warning which is presented to an operator of the industrial truck until the obstacle is no longer in the protection zone.

12. The industrial truck of claim 11, wherein classifying the current degree of difficulty is further based on:

a level of experience of a driver of the industrial truck.

13. The industrial truck of claim 11, wherein the at least one sensor unit comprises a light detection and ranging (LIDAR) unit.

14. The industrial truck of claim 11, wherein the industrial truck comprises a manually operated industrial truck.

15. The industrial truck of claim 11, wherein a smaller of the right side steering angle difference and the left side steering angle difference is used to classify the current degree of difficulty.

16. The industrial truck of claim 11, wherein available classifications for the current degree of difficulty comprise at least an easy difficulty level and a high difficulty level.

17. The industrial truck of claim 11, wherein the control unit is further configured to define a maximum steering angle of the industrial truck that cannot be exceeded to avoid a collision.

18. The industrial truck of claim 11, wherein the protection zone is calculated in polar coordinates using a polar coordinate system.

19. The industrial truck of claim 18, wherein one or more of:

a pole of the polar coordinate system corresponds to a center point of the industrial truck in relation to a longitudinal and width axis thereof, or a polar axis of the polar coordinate system corresponds to the main direction of travel of the industrial truck.

* * * * *